United States Patent
Hill

(10) Patent No.: US 11,554,746 B2
(45) Date of Patent: Jan. 17, 2023

(54) ONE-PIECE WOVEN VEHICLE OCCUPANT PROTECTION DEVICE AND METHOD FOR MANUFACTURING THE SAME

(71) Applicant: ZF PASSIVE SAFTY SYSTEM US INC., Washington, MI (US)

(72) Inventor: Bruce R. Hill, Bloomfield Hills, MI (US)

(73) Assignee: ZF PASSIVE SAFTY SYSTEM US INC., Washington, MI (US)

( * ) Notice: Subject to any disclaimer, the term of this patent is extended or adjusted under 35 U.S.C. 154(b) by 0 days.

(21) Appl. No.: 16/964,647

(22) PCT Filed: Feb. 27, 2019

(86) PCT No.: PCT/US2019/019697
§ 371 (c)(1),
(2) Date: Jul. 24, 2020

(87) PCT Pub. No.: WO2019/168882
PCT Pub. Date: Sep. 6, 2019

(65) Prior Publication Data
US 2021/0138994 A1    May 13, 2021

Related U.S. Application Data

(60) Provisional application No. 62/635,590, filed on Feb. 27, 2018.

(51) Int. Cl.
*B60R 21/235* (2006.01)
*B60R 21/232* (2011.01)
(Continued)

(52) U.S. Cl.
CPC .......... *B60R 21/235* (2013.01); *B60R 21/232* (2013.01); *D06N 3/0006* (2013.01);
(Continued)

(58) Field of Classification Search
CPC ........ B60R 2021/23547; B60R 21/232; B60R 21/235; B60R 2021/23514; B60R 21/213;
(Continued)

(56) References Cited

U.S. PATENT DOCUMENTS

2006/0128244 A1   6/2006 Hill
2009/0124149 A1*  5/2009 Barnes .................. D01D 10/02
                                                    428/401

(Continued)

FOREIGN PATENT DOCUMENTS

WO         9812075         3/1998

*Primary Examiner* — Arti Singh-Pandey
(74) *Attorney, Agent, or Firm* — Tarolli, Sundheim, Covell & Tummino LLP

(57) ABSTRACT

A method for manufacturing a one-piece woven (OPW) air bag includes providing yarns having a spin finish and warping the yarns on at least one beam of a loom. The yarns are simultaneously woven into a fabric air bag structure having two layer portions defining an inflatable volume and single layer portions forming seams delimiting the inflatable volume. The air bag structure is coated to cover the spin finish. The coated air bag structure is cut to define the one-piece woven air bag.

18 Claims, 8 Drawing Sheets

(51) Int. Cl.
*D06N 3/00* (2006.01)
*D06N 3/06* (2006.01)
*D06N 3/12* (2006.01)
*D03D 1/02* (2006.01)

(52) U.S. Cl.
CPC ............... *D06N 3/06* (2013.01); *D06N 3/128* (2013.01); *B60R 2021/23514* (2013.01); *B60R 2021/23547* (2013.01); *D03D 1/02* (2013.01); *D06N 2203/045* (2013.01); *D06N 2203/066* (2013.01); *D06N 2209/067* (2013.01); *D06N 2209/12* (2013.01); *D10B 2505/124* (2013.01); *Y10T 442/2631* (2015.04); *Y10T 442/2934* (2015.04)

(58) Field of Classification Search
CPC .... D03D 11/02; D03D 1/02; D06N 2203/045; D06N 2203/066; D06N 2209/067; D06N 2209/12; D06N 3/0006; D06N 3/06; D06N 3/128; Y10T 442/2631; Y10T 442/2934
See application file for complete search history.

(56) References Cited

U.S. PATENT DOCUMENTS

| | | |
|---|---|---|
| 2010/0109305 A1 | 5/2010 | Miyata |
| 2013/0026740 A1 | 1/2013 | Finn et al. |
| 2014/0265279 A1 | 9/2014 | Ise et al. |
| 2014/0302263 A1 | 10/2014 | Ise et al. |
| 2017/0182968 A1 | 6/2017 | Hill et al. |
| 2018/0030649 A1* | 2/2018 | Hotta .................. D06M 13/248 |

* cited by examiner

ONE-PIECE WOVEN VEHICLE OCCUPANT PROTECTION DEVICE AND METHOD FOR MANUFACTURING THE SAME

CROSS REFERENCE TO RELATED APPLICATIONS

This application is a national stage of International Application No. PCT/US2019/019697, filed Feb. 27, 2019, which claims priority to U.S. Provisional Patent Application No. 62/635,590, filed Feb. 27, 2018. The disclosures of these applications are incorporated herein by reference in their entireties.

TECHNICAL FIELD

The present invention relates generally to an apparatus for helping to protect an occupant of a vehicle. More particularly, the present invention relates to a one-piece woven (OPW), inflatable air bag and a method of manufacturing the same.

BACKGROUND OF THE INVENTION

It is known to inflate an inflatable vehicle occupant protection device to help protect a vehicle occupant in the event of a vehicle collision. Examples of inflatable vehicle occupant protection devices include driver and passenger frontal air bags, side air bags, curtain air bags, inflatable seat belts, inflatable knee bolsters, and inflatable head liners.

Inflatable vehicle occupant protection devices can have a variety of constructions. For example, an inflatable vehicle occupant protection device can be constructed of overlying woven panels that are interconnected by means, such as stitching or ultrasonic welding, to form connections or seams that help define an inflatable volume of the protection device. As another example, an inflatable vehicle occupant protection device can have a one-piece woven (OPW) construction in which overlying panels are woven simultaneously. The panels are woven together to form connections or seams that help define an inflatable volume of the OPW protection device.

Current manufacturing methods for OPW air bags involve a multi-step process that is both time consuming and costly. To this end, FIG. 1A illustrates a conventional manufacturing process for producing yarns woven to form current OPW protection devices. In FIG. 1A, chips of various polymers, e.g., nylon and polyethylene terephthalate (PET), are mixed and placed into a chip hopper. The mixture is pumped to a single-screw extruder, which leads to a spinneret. The spinneret further extrudes the mixture into a series of yarn filaments via melt spinning.

The spinning filaments are gathered at their ends opposite the spinneret to form a thread of yarns. During melt spinning, air is applied to the filaments in a quenching operation. This cools and solidifies the filaments. The filaments, however, are not conductive and, thus, static electricity can be problematic during the spinning/gathering step. To overcome this issue, a spin finish is applied, e.g., sprayed by an applicator, to the spinning filaments before they are completely gathered to form the thread.

The spin finish is generally produced by emulsifying alkyl chain molecules with the aid of surfactants in aqueous medium. In some examples, the spin finish is oil-based and accounts for about 0.5-1.0% by weight of the OPW protection device. The type of spin finish used is based on the type of post processing the thread will experience. Regardless, the spin finish provides surface lubrication, antistatic action, and improves contact/cohesion between the filaments. The spin finish coat also provides an interface between the filament and any other contact surface of the loom, for example, a guide roll, hot plate, knitting needle, etc. (see: 1) Sahas Bansal & Pramod Raichurkay, Review on the Manufacturing Process of Polyester-PET and Nylon-6 Filament Yarn, 2 Intl. J. L. on Textile Engineering and Processes 23-28 (2016), and 2) Gupta, V. B., & Kothari V. K., Manufactured Fibre Technology, 140 (Chapman & Hall, 1997)).

The thread—having its yarn filaments coated in spin finish—is passed through take up godets and friction rollers to draw the thread. The speeds $V_1$-$V_3$ of the godets and rollers increase in succession, which reduces the longitudinal cross-section of the thread while lengthening it. The drawing process also aligns the yarn molecules in a more parallel arrangement and brings the molecules closer together so as to be more crystalline and oriented. In any case, the thread is taken up on a winder.

Referring to FIG. 1B, the yarns (in thread form) are taken from the winder and placed on at least one beam of a loom (also known as warping). The yarns are then simultaneously woven as separate, overlying layers of material at some locations, and as a single layer of material at other locations to produce an OPW fabric panel. In one example, the overlying layers form an inflatable chamber and the single layer forms a seam.

During the weaving process, the warp yarns abrade against the weft yarns while passing over and under one another. On the loom, the warp yarns are subjected to several types of stress-related action, e.g., cyclic strain, flexing, and abrasion at various loom parts and friction between yarns. In other words, both the loom and other yarns can contribute to the level of stress applied to the warp yarns. This can vary depending on, for example, the weave pattern, weave density, etc.

A film is applied to the yarns prior to weaving as a precautionary/preventative measure in anticipation of these induced stresses, which helps promote the integrity of the yarns and protect them during weaving. This film application process is known as sizing and can be done, for example, by dipping the yarns into the film or spraying the yarns. Different types of water-soluble polymers called textile sizing agents/chemicals can be used. Example sizing agents include modified oil, starch, gelatin, polyvinyl alcohol (PVA), carboxymethyl cellulose (CMC), and acrylates. Wax can be added to the sizing to reduce the abrasiveness of the warp yarns. In any case, the sizing typically accounts for about 1.0-3.0% by weight of the OPW fabric roll.

The film applied at the sizing step protects the yarn from abrasion and increases the breaking strength, elasticity, and smoothness of the yarn while decreasing the static electricity and hairiness of the yarn. The sizing therefore provides structural integrity to the yarn during weaving. The degree of strength improvement depends on the adhesion force between the fiber and the sizing, the amount of sizing penetration, and the degree of encapsulation of the yarn by the sizing.

In current processes, the OPW fabric panel is rolled up and washed to remove the sizing film from the yarns. This removal process is known as scouring, and can be time consuming and costly. To this end, the scouring process can include washing the OPW fabric in tanks repeatedly with soap and water at elevated temperatures. Once this is done, it is desirable to apply an outer coating and/or lamination to the washed OPW fabric to improve the permeability, flame retardation, etc. of the air bag ultimately formed from the OPW fabric.

As noted, however, the yarn spin finish is typically oil-based, which is not conducive to receiving or adhering to the types of outer coatings/laminations desirable for air bag fabrics. That said, if only the sizing were removed in the scouring process, the outer coating/lamination could not be applied to the spin-finish coated yarns. In other words, the spin finish undesirably prevents the air bag from receiving its outer coating/lamination. Accordingly, the scouring process is configured to also remove the spin finish from the yarns, thereby allowing the yarns to receive the outer coating/lamination.

Once the sizing and spin finish are removed from the yarns the washed OPW fabric is dried and/or heat set. In one example, this constitutes vacuuming the excess water off the fabric followed by drying the fabric with heat. The outer coating and/or lamination can then be applied directly to the spin-finish-free yarns of the dried roll. The coated roll is then cut using marker yarns to separate the roll into individual OPW air bags.

SUMMARY OF THE INVENTION

According to one aspect, a method for manufacturing a one-piece woven (OPW) air bag includes providing yarns having a spin finish and warping the yarns on at least one beam of a loom. The yarns are simultaneously woven into a fabric air bag structure having two layer portions defining an inflatable volume and single layer portions forming seams delimiting the inflatable volume. The air bag structure is coated to cover the spin finish. The coated air bag structure is cut to define the one-piece woven air bag.

According to another aspect, an OPW air bag includes a fabric structure having two layer portions defining an inflatable volume and single layer portions forming seams delimiting the inflatable volume, the fabric structure comprising woven yarns having a spin finish provided thereon. A coating covers the spin finish.

According to another aspect, taken alone or in combination with any other aspect, the coating comprises silicone.

According to another aspect, taken alone or in combination with any other aspect, the coating comprises a polyvinyl chloride (PVC) base coat.

According to another aspect, taken alone or in combination with any other aspect, the coating includes a phosphate-based flame retardant material.

According to another aspect, taken alone or in combination with any other aspect, the air bag structure is coated without scouring the yarns.

According to another aspect, taken alone or in combination with any other aspect, the air bag structure is coated without washing the yarns.

According to another aspect, taken alone or in combination with any other aspect, the air bag structure is coated without drying the yarns.

According to another aspect, taken alone or in combination with any other aspect, the step of warping the yarns on a loom comprises warping the yarns on at least one beam of an air-jet or rapier loom.

According to another aspect, taken alone or in combination with any other aspect, the coating has a T-peel adhesion with the air bag structure of about 0.78 to about 1.13.

According to another aspect, taken alone or in combination with any other aspect, the spin finish comprises about 1.0-3.0% by weight of the OPW air bag.

According to another aspect, taken alone or in combination with any other aspect, the air bag structure forms a side curtain.

DETAILED DESCRIPTION

The present invention relates generally to an apparatus for helping to protect an occupant of a vehicle. More particularly, the present invention relates to an OPW, inflatable air bag and a method of manufacturing the same. The method includes weaving the OPW air bag on an air-jet or rapier loom and thereafter coating and/or laminating the air bag to improve its gas impermeability. Advantageously, this method allows the coatings and/or laminations to be applied to the OPW air bag in loom-state without scouring, heating, washing or drying the fabric.

Figure 1A:
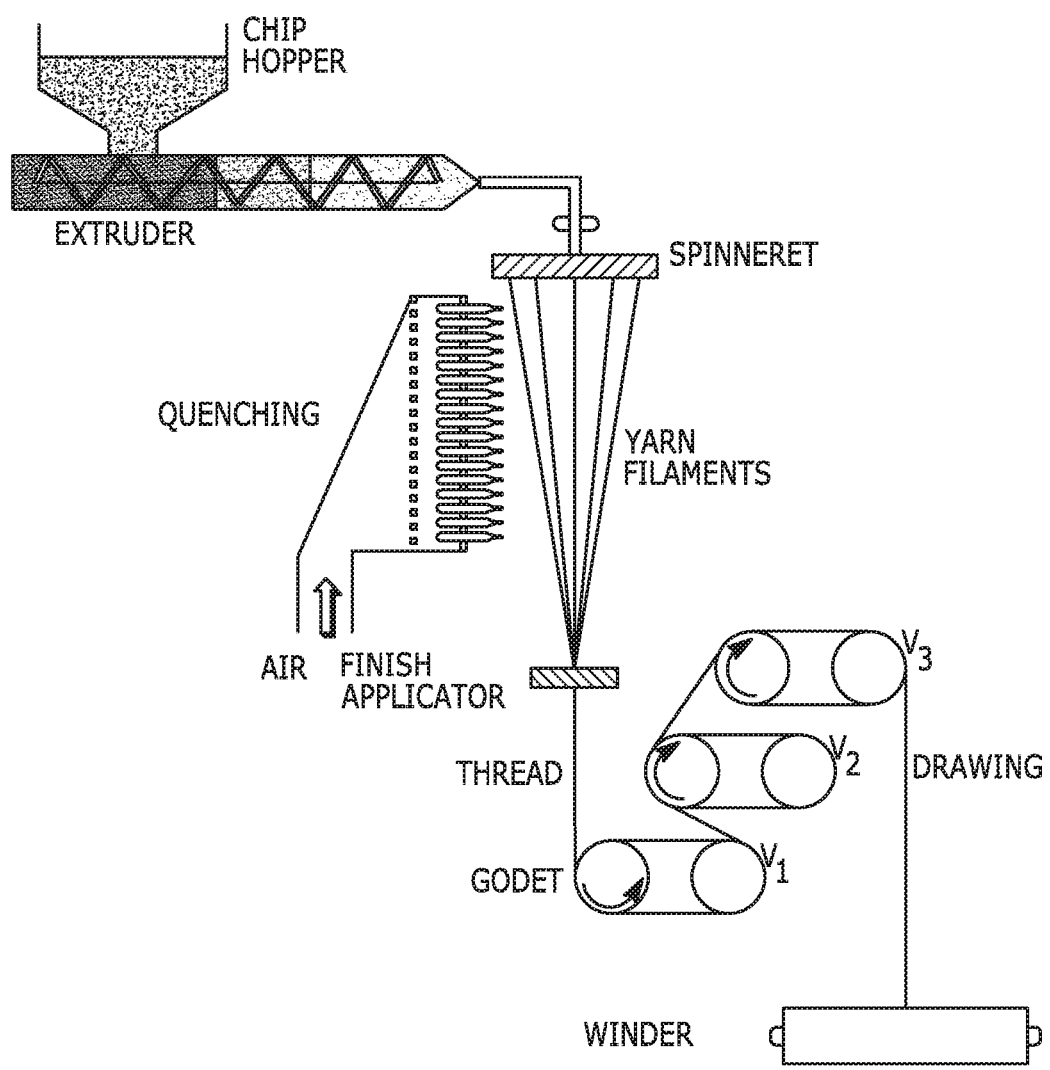
FIG. 1A is a schematic illustration of a current yarn manufacturing process.
Figure 1B:
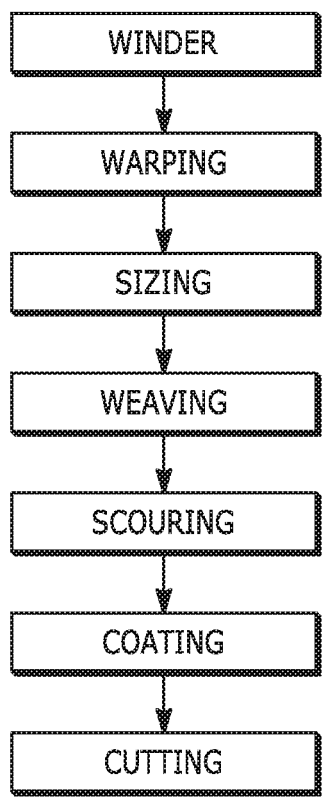
FIG. 1B is a flow chart illustrated a current method of forming a protection device with the yarn made from the process of FIG. 1A.
Figure 2:
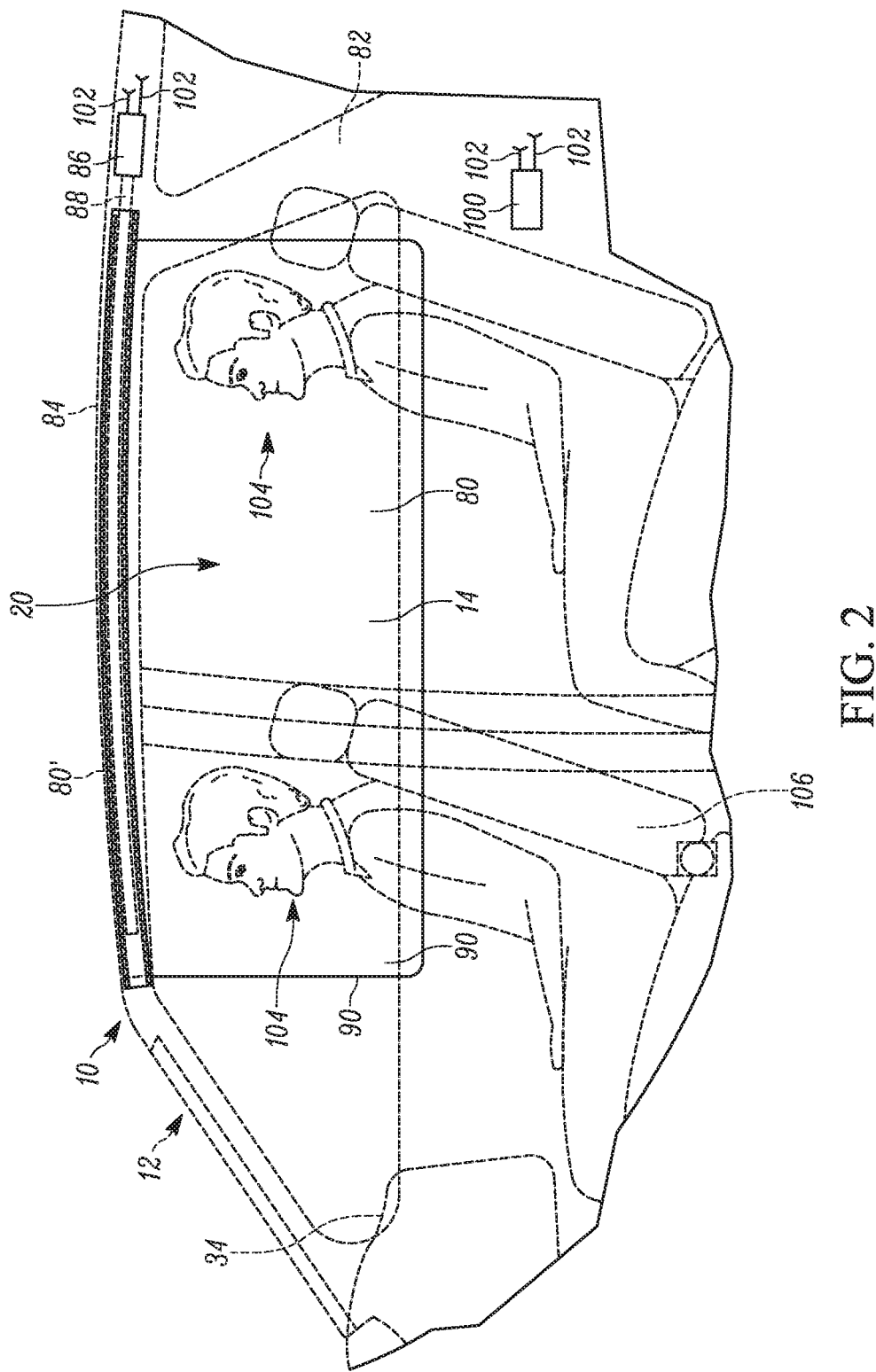
FIG. 2 is a schematic view of an example apparatus for helping to protect an occupant of a vehicle.
Figure 3:
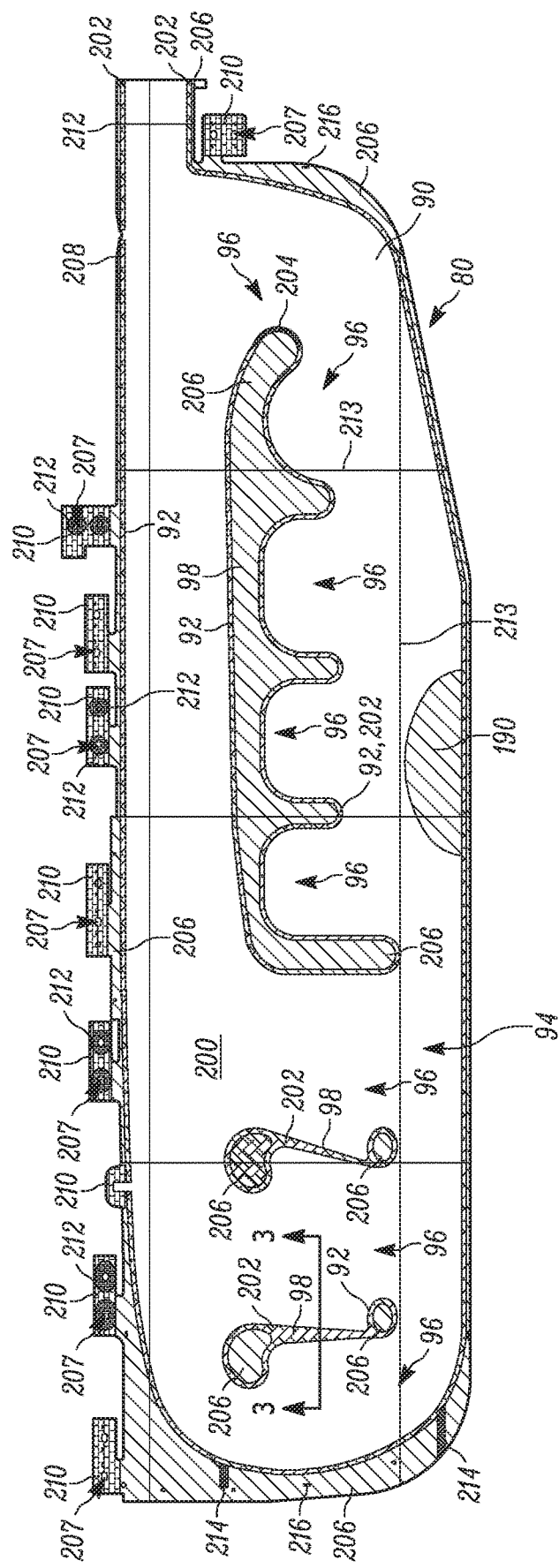
FIG. 3 is a side view of a curtain air bag of the apparatus of FIG. 2.

FIGS. 2 and 3 illustrate an example configuration of an apparatus 10 for helping to protect one or more occupants 104 of a vehicle 12. The apparatus 10 of the example configuration is an inflatable vehicle occupant protection device 14 that is inflatable/deployable between a side structure 82 of a vehicle 12 the vehicle occupant(s) 104. In this configuration, the inflatable vehicle occupant protection device 14 can also be referred to as a curtain air bag 80, which can cover at least two of the A, B, and C pillars of a vehicle 12. The inflatable vehicle occupant protection device 14 can, however, have alternative configurations.

For example, the inflatable vehicle occupant protection device 14 can be configured for deployment in any known location of the vehicle, e.g., steering wheel, door, front seat, etc. Other vehicle occupant protection devices (not shown) that can be constructed in accordance with the invention can include, for example, side impact air bags, inflatable seat belts, inflatable knee bolsters, and inflatable head liners. The apparatus 10 can therefore be used to protect the driver and/or any number of passengers in the vehicle 12. In the example configuration of FIG. 2, the inflatable vehicle occupant protection device 14 is a curtain air bag 80 for a passenger side 20 of the vehicle 12. A similar or identical curtain air bag (not shown) can be provided on a driver side of the vehicle 12.

The curtain air bag 80 is mounted adjacent a side structure 82 and roof 84 of the vehicle 12. An inflator 86 is fluidly connected with the curtain air bag 80 through a fill tube 88.

The inflator 86 can have a known construction suitable for inflating the curtain air bag 80. For example, the inflator 86 can contain a stored quantity of pressurized inflation fluid (not shown) in the form of a gas for inflating the curtain air bag 80. Alternatively, the inflator 86 can contain a combination of pressurized inflation fluid and ignitable material for heating the inflation fluid, or can be a pyrotechnic inflator that uses the combustion of gas-generating material to generate inflation fluid. As a further alternative, the inflator 86 can be of any suitable type or construction for supplying a medium for inflating the curtain air bag 80.

The fill tube 88 includes openings (not shown) through which inflation fluid is directed into the curtain air bag 80. The fill tube 88 can be constructed of any suitable material, such as plastic, metal or fabric. Alternatively, the fill tube 88 can be omitted, in which case the inflator 86 can be connected directly to the curtain air bag 80 (not shown).

Referring to FIG. 3, in this example configuration, the curtain air bag 80 includes integrally formed panels 90 that cooperate to define an inflatable volume 94. Seams 92 extending along the panels 90 help define inflatable chambers 96 within the inflatable volume 94 and non-inflatable portions 98 of the curtain air bag 80. The curtain air bag 80 has an OPW construction in which the air bag is a single unitary woven article with portions, i.e., the panels 90, woven simultaneously as separate, single layers of material, and portions, i.e., the seams 92, woven as a single layer. The OPW construction can be especially beneficial in a curtain air bag construction because this construction can afford long duration inflation and high pressurization capabilities, which can be desirable for this and other types of air bags.

The vehicle 12 includes one or more sensors (shown schematically at 100 in FIG. 2) for sensing the occurrence of an event for which inflation of the curtain air bag 80 is desired. Examples of such events include a vehicle impact, e.g., front, rear, side, offset, or angled impacts, a vehicle rollover, or both. Upon sensing the event, the sensor 100 provides electrical signal(s) over lead wires 102 to the inflator 86 (or a controller connected thereto), which causes the inflator to be actuated in a known manner and discharge fluid under pressure into the inflatable volume 94 of the curtain air bag 80.

The particular OPW configuration of the curtain air bag 80 is by way of example only. The present invention is suited for implementation in OPW air bag structures having any configuration, e.g., multiple inflatable portions, a single inflatable portion, no inflatable portions, and any number of seams, including zero.

The curtain air bag 80 is inflatable from a deflated and stored condition, illustrated in dashed lines at 80' in FIG. 2, to an inflated and deployed condition, illustrated in solid lines at 80 in FIG. 2. More specifically, the curtain air bag 80 inflates under the pressure of the inflation fluid from the inflator 86 away from the roof 84 to a position between the side structure 82 of the vehicle 12 and any occupants 104 of the vehicle. The curtain air bag 80, when inflated, helps protect the vehicle occupant(s) 104 in the event of an impact to the vehicle 12, a vehicle rollover, or both. The curtain air bag 80, when inflated, also helps absorb the energy of impacts with the curtain air bag and helps distribute the impact energy over a large area of the curtain air bag.

The curtain air bag 80 has an OPW construction that promotes seam integrity, easier and more compact packaging, and uniform shrinkage in the weft direction. To accomplish this, the OPW construction of the curtain air bag 80 is configured such that certain portions of the air bag are woven with different weave patterns. In describing the curtain air bag 80, reference is made to its a length, which is measured in a warp direction (left to right as viewed in FIG. 3), and its width, which is measured perpendicular to the length and in a weft direction (top to bottom as viewed in FIG. 3).

Figure 4:
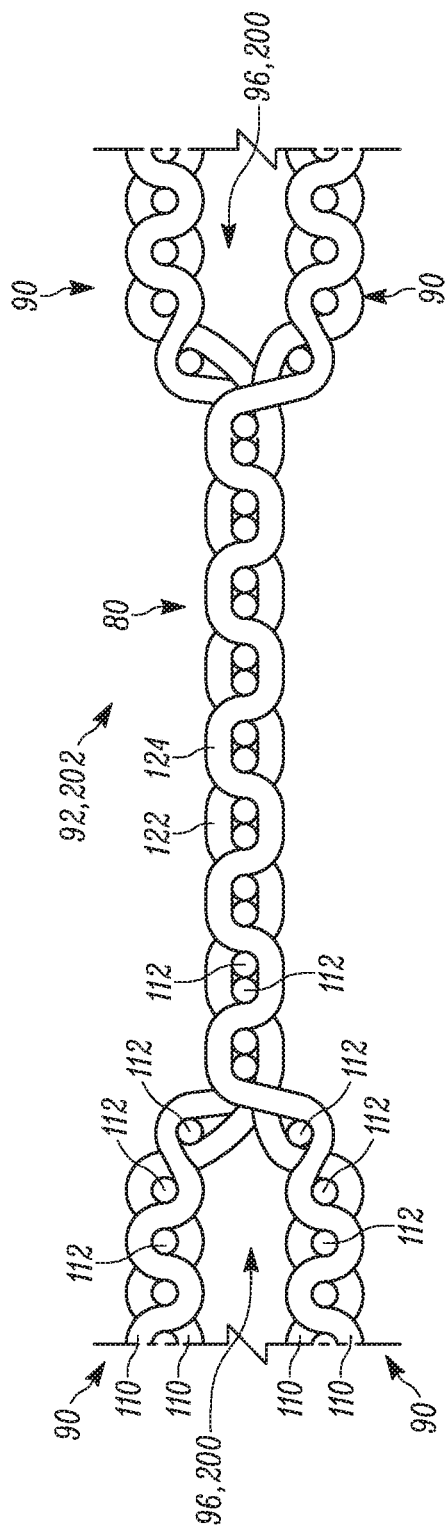
FIG. 4 is a sectional view taken generally along line 4-4 in FIG. 3 illustrating the weave of a portion of the curtain air bag.

Referring to FIG. 4, the panels 90 each includes a plurality of warp yarns, or "ends", indicated at 110. The panels 90 also each includes a plurality of weft yarns, or "picks," indicated at 112. The warp yarns 110 and the weft yarns 112 are oriented perpendicular to each other. The warp yarns 110 are interlaced with the weft yarns 112 in an alternating or "up and down" fashion. In areas of the curtain air bag 80 other than the seams 92, each panel 90 is woven in a one-by-one (1×1) weave pattern referred to in the art as a "plain weave" pattern. In this plain weave pattern, single warp yarns 110 are interlaced around single weft yarns 112, as shown in FIG. 4. Since the curtain air bag 80 has an OPW construction, the plain weave is referred to in the art as a double layer plain weave.

Weave patterns include what are referred to in the art as "floats." A "float" refers to the number of adjacent warp yarns 110 or a weft yarns 112 that a weft yarn or warp yarn, respectively, extends over or under. The number of floats in a woven fabric varies with the particular type of weave with which the fabric is woven. For example, a plain woven fabric includes single floats because the warp and weft yarns pass over and under single weft and warp yarns, respectively. As another example, a 2×2 woven fabric includes two floats because the warp yarns and weft yarns pass over and under two adjacent weft and warp yarns, respectively.

The seams 92 have constructions that vary from the plain weave pattern in order to provide a desired function for the particular seam. In the portion illustrated in FIG. 4, the seam 92 has a non-plain, one-by-two (1×2) weave pattern, hereafter referred to as a low float weave pattern. Low float weave patterns are shown and described in U.S. Patent Publication No. 2006/0284403, the entirety of which is incorporated herein by reference.

In this 1×2 weave pattern, the warp yarn 110 identified at 122 is a first warp yarn and the warp yarn identified at 124 is a second warp yarn. The yarns 122 and 124 are interlaced alternately over and under groups of two weft yarns 112. Each warp yarn 110 is interlaced on opposite sides of each weft yarn 112. It will be appreciated, however, that the seam 92 can have an alternative non-plain weave pattern, examples of which are noted below.

In areas of a fabric where different weave patterns interface with each other floats in addition to those normally occurring in the weave patterns may occur. This is especially relevant in an OPW air bag design where a double layer plain weave interfaces with a non-plain weave pattern, e.g., at the transitions between the inflatable chambers 96 and the seam 92. The number and location of these excess floats is determined by the weave pattern of the fabric at the interface. While the existence of excess floats at the interface may be unavoidable, the weave pattern may be configured, to a large extent, to help place a desired number of floats in a desired location at the interface between the weave patterns.

In the example configuration, the curtain air bag 80 includes both plain woven portions and non-plain woven portions. Portions 200 of the curtain air bag 80 (indicated without cross-hatching) identify portions of the woven panels 90 woven in separate layers with a plain weave. Portions identified by cross-hatching at 202 of the curtain air bag 80 identify portions of the woven panels 90 woven together with the 1×2 low float weave pattern to help form the seams 92 of the curtain air bag 80. Portions identified by cross-hatching at 204 of the curtain air bag 80 identify portions portions of the woven panels 90 woven together with a gegenschlauch ("counter tube") seam to help form additional seams 92 of the curtain air bag 80. The portions 202, 204 forming the seams 92 can have alternative weave patterns, one or more of: a 3×3 panama weave pattern, a basket weave pattern, an alternative basket weave pattern and/or a weave repeat pattern.

A portion identified by cross-hatching at 206 extends around the entire periphery 208 of the curtain air bag 80 and identifies portions of the panels 90 woven together with a BST 99 weave pattern. Portions identified by cross-hatching at 210 of the curtain air bag 80 are provided along the top of the periphery 208 and at the rear end of the curtain air bag. Each portion 210 includes one or more openings 207 that receive fasteners (not shown) to help secure the curtain air bag 80 to the vehicle 12 adjacent the roof 84. The portions 210 identify portions of the panel 90 woven together with a rip stop weave pattern. Portions identified by cross-hatching at 212 of the curtain air bag 80 are provided within the perimeter of some portions 210 and identify portions of the panel 90 woven together with a BST 24 weave pattern. The portions 212 extend around the openings 207 in the portions 210.

Portions identified by cross-hatching at 214 of the curtain air bag 80 are provided at the front end of the curtain air bag and identify portions of the panels 90 woven together with a 3×3 panama/basket weave pattern. Portions 216 of the curtain air bag 80 are provided at the front and rear ends of the curtain air bag and identify portions of the panels 90 woven together with a measure marker weave pattern. It will be understood that any of the portions 206, 210, 212, 214, 216 can exhibit alternative weave patterns known in the art.

The plain woven and non-plain woven portions of the panels 90 can have different gas permeabilities. For example, the non-plain woven portions can have a higher gas permeability than the plain woven portions due to the looser weave and higher propensity for yarn shifting in the non-plain weave. To this end, and referring to FIG. 3, an outer coating and/or lamination 190 can be applied to the panels 90 to help control the gas permeability of the panels and maintain the gas permeability of the panels at a desired level. The curtain air bag 80 can thus maintain the improved seam integrity and packaging provided by the plain and non-plain woven portions described above without sacrificing gas permeability.

The coating 190 can be any coating suited to provide desired permeability characteristics. For example, the coating 190 can comprise a gas impermeable or substantially gas impermeable urethane or silicone material. Possible coatings usable with the present invention include, but are not limited to, the CS2 coating available from Bradford Industries (Lowell, Mass.). The CS2 coating can be silicone coated nylon and/or polyester and can include a PVC base coat. To help prevent blocking, a polyether or polyester based urethane coating can be applied as an additional coating or can be mixed with the coating 190. A liquid-based flame retardant such as a phosphate, e.g., phosphoric acid, 1, 3-phenylene tetraphenyl ester (sold under the trade name Fyroflex™ RDP (ICL-IP America Inc., St. Louis, Mo.) or aryl phosphate (sold under the trade name Lindol CDP (also ICL-IP America Inc.)), can also be added to the coating 190.

Figure 5:
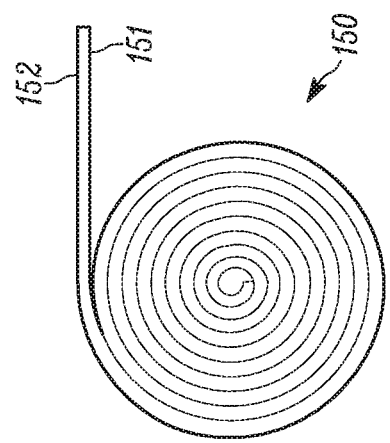
FIG. 5 is a side view of a roll of fabric material for forming the curtain air bag of FIG. 3.
Figure 6:
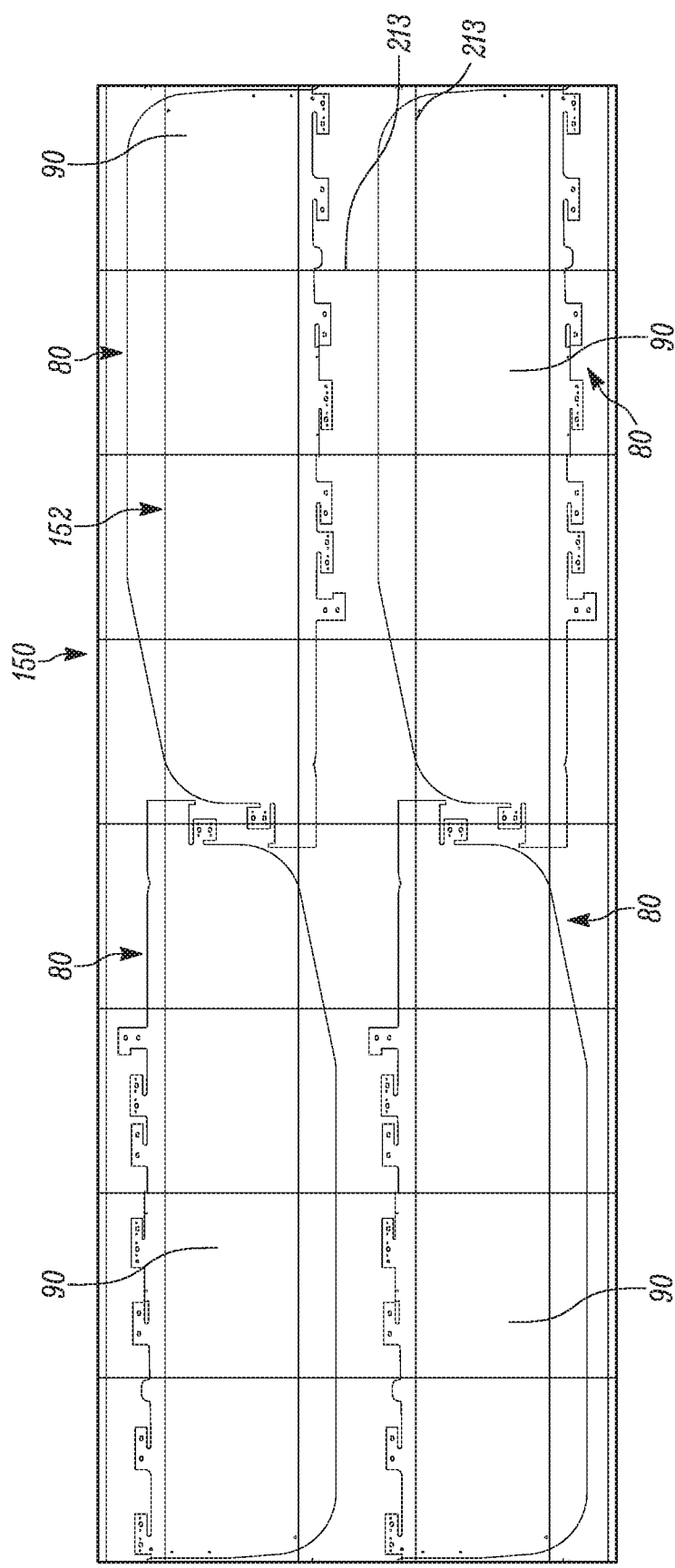
FIG. 6 illustrates the roll of FIG. 5 in an unfurled state.

The panels 90 used to construct the curtain air bag 80 are formed in a continuous roll of fabric material 150, shown in FIG. 5 (rolled) and FIG. 6 (unrolled). The weave patterns used to weave the panels 90 are selected to promote processing the woven roll 150 of material. Once the roll 150 is produced and any coating(s) 190 applied, the panels 90 are cut out from the roll to define the curtain air bag 80. This cutting can be performed by cutting machines (not shown) that use vision systems to help improve cutting accuracy.

The vision systems search for markers on the fabric of the roll 150 that allow the system to determine whether cuts are being made at the proper locations. Typically, these markers comprise intersecting marker yarns 213 (FIG. 6) woven into the fabric of the panels 90 when the roll 150 in an unfurled state. The marker yarns 213 have a color that is different from the rest of the fabric on the roll 150 and therefore stand out visually. The marker yarns 213 are visible on a first side 152 of the roll 150, with a second, opposite side 151 of the roll being white.

To weave the intersecting marker yarns 213, a beam of warp yarn having the marker color is installed at one or more warp positions on the loom. To form the marker yarn 213 intersections, yarns are inserted at the appropriate weft locations along the length of the roll 150 and inserted at the appropriate warp locations. As a result, a grid of warp and weft marker yarns 213 is formed on the first side 152 of the roll 250. The marker yarns 213 can be, for example, 470 dtex black marker yarns capable of being recognized by the vision system.

Figure 7:
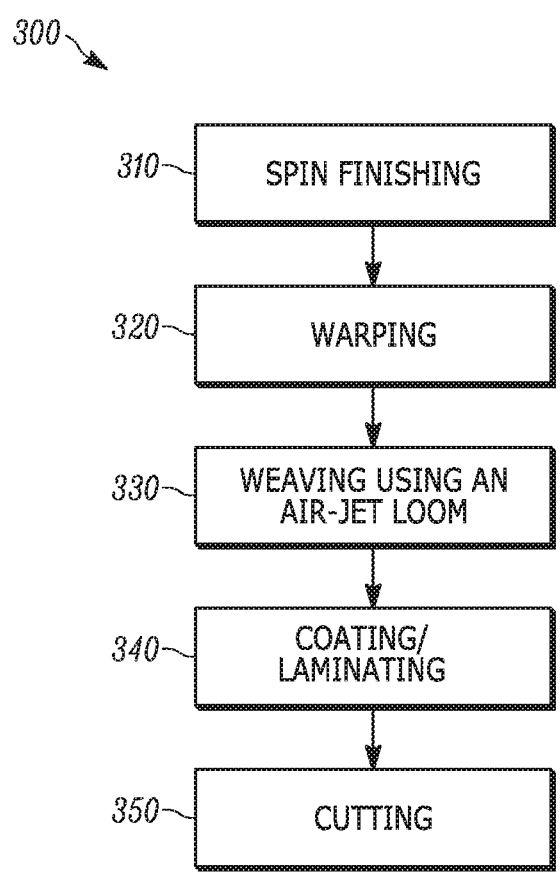
FIG. 7 is a flow chart illustrating a method of forming the apparatus of FIG. 2.

In one example method 300 for forming the curtain air bag 80 shown in FIG. 7, at step 310 yarns are provided that include a spin finish. At step 320, the yarns are warped on at least one beam of a loom, e.g., an air-jet loom or rapier loom. At step 330, the warped yarns are woven on the loom to form the roll 150 (see FIG. 5) having an OPW construction.

The fabric at this stage is in "loom state" in that the yarn is unaltered from its condition on the loom once weaving ends. In other words, the yarn still includes the spin finish. At step 340, the roll 150 of loom-state yarn is coated with the coating 190, which covers or encapsulates the spin finish on the yarns. It will be appreciated that the coating 190 can directly contact the spin finish or be spaced therefrom by an intermediate coating (not shown) added to provide desired characteristics to the coated roll 150. Regardless, the coating 190 covers the spin finish. In any case, at step 350, the coated roll 150 is cut to the pattern shown in FIG. 6 to define the curtain air bag 80.

In accordance with the present invention, using particular coatings 190 with an air-jet loom or rapier loom to form the OPW curtain air bag 80 eliminates several of the steps described above related to current OPW protection device manufacturing processes. In particular, using an air-jet loom or rapier loom and the coatings 190 described and contemplated herein eliminates sizing, scouring, and drying of the yarns. This is possible because the coatings 190 selected are particularly suited to bond/adhere to the loom-state yarns that still include the yarn spin finish. Due to this construction, the woven yarns do not need scouring or washing to remove the spin finish before applying the outer coating or lamination 190. Moreover, since air-jet and rapier looming is performed under dry conditions, there is no need to dry the roll 150 prior to applying the coating 190.

One having ordinary skill in the art would believe that loom-state yarns are unsuitable to receive a coating due to the presence of the spin finish and sizing. More specifically, one would assume that both the spin finish and sizing would have to be removed from the yarn before coating can occur because the oil-based nature of most spin finishes and the stiffness of most sizings make them ill-suited to receive the outer coatings/laminations typically used for air bags. Consequently, the scouring/washing, heating, and drying steps are currently performed to substantially or entirely remove the sizing and spin finish. This more adequately prepares the woven yarns for receiving the air bag coating.

In some cases, the sizing can be omitted from the process entirely. There is no evidence, however, that the same can be said for the spin finish as its lubricating nature is needed to ensure that proper/adequate weaving is achieved. That said, to date no process exists that allows the loom-state yarns—having the spin finish thereon—to be properly coated for use in an air bag cushion. With this in mind, the present invention is advantageous for allowing the loom-state yarns to be coated without first removing the spin finish by specifically selecting a coating 190 that capable of adequately adhering to and covering the spin finish left on the woven yarns.

Example 1

Figure 8:
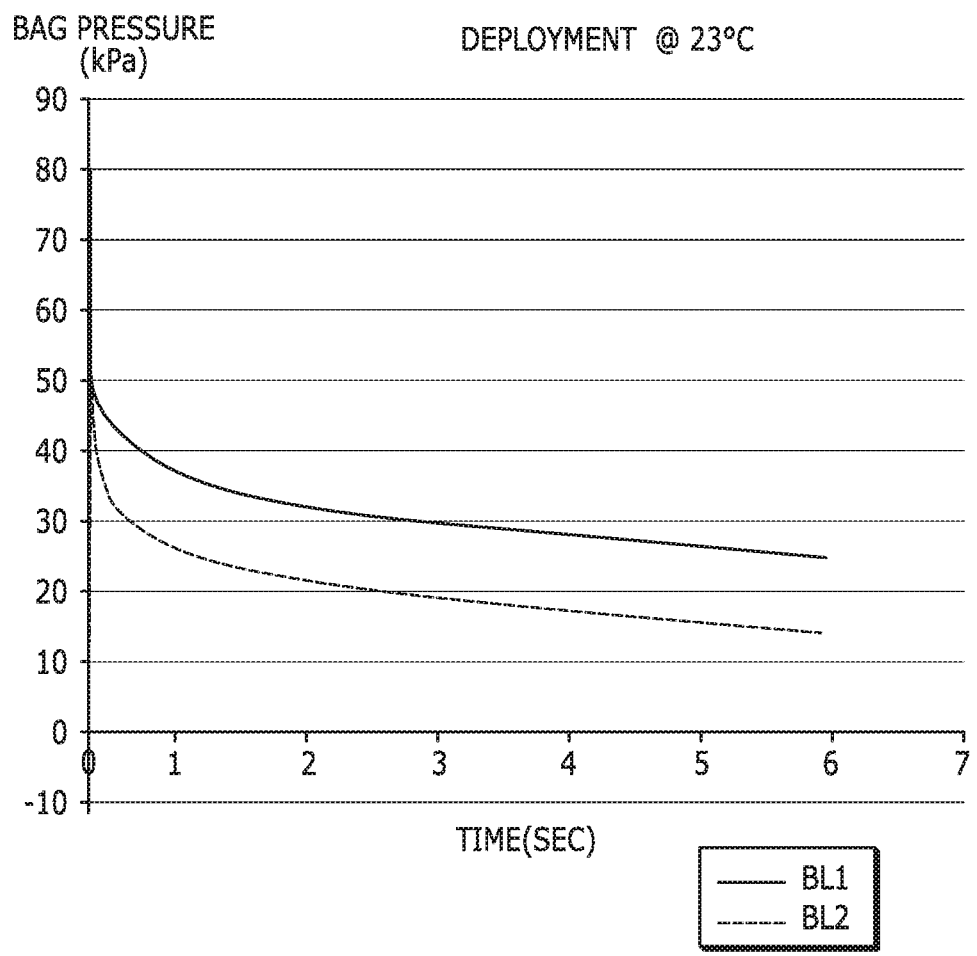
FIG. 8 is a graph illustrating deployment properties of a curtain air bag formed in accordance with the present invention.

One-piece woven (OPW) inflatable air bags in accordance with the present invention were formed using a Dornier (Lindan, Germany) air-jet loom. The yarn used was 470 dtex/96 polyethylene terephthalate (PET) from Hailide® America, Inc. (Atlanta, Ga.). The coating used was the CS2 coating from Bradford Industries. Two air bags were used as a baseline ("BL1" and "BL2"). Three air bags were heat aged at low humidity ("HA1") for 408 hours at 105° C. Three air bags were heat aged at high humidity ("HA2") for 408 hours at 70° C. at 95% relative humidity. Three air bags were sequentially aged ("HA3") using thermal shock, heat aging, and salt spraying using a Thermotron #4 SE-1000 6-6 test chamber and a Russells thermal shock chamber. Bag dimensions were checked before and after. The air bags were then statically deployed at 23° C., 85° C., and −35° C. (1 at each temperature). The deployment characteristics of the baseline air bags BL1 and BL2 at a deployment temperature of 23° C. are shown in FIG. 8. The heat aged air bags HA1-HA3 exhibited no visual damage.

Flex abrasion testing was performed on both the marker side and white side of each air bag (BL1, BL2, HA1-HA3) in accordance with ISO 5981. The number of cycle counts (in strokes)—up to 2000 or coating failure—were observed in each case. All air bags tested passed.

Example 2

OPW inflatable air bags in accordance with the present invention were formed using a Dornier air-jet loom. The yarn used was 470 dtex/96 PET from Hailide®. The coating used was the CS2 coating from Bradford Industries. Flex abrasion testing was performed on both the marker side and white side of the air bags in accordance with ISO 5981. The number of cycle counts (in strokes)—up to 300 or coating failure—were observed in each case. All air bags tested passed.

The T-peel adhesion data (units in n/mm) for the coated air bags is as follows for Bags 1 and 4:

|  | Warp Marker Side | Fill Marker Side | Warp White Side | Fill White Side |
|---|---|---|---|---|
| Bag 1 | 0.97 | 0.79 | 0.86 | 0.78 |
| Bag 4 | 1.07 | 1.13 | 0.84 | 0.90 |

|  | Warp Marker Side | Fill Marker Side | Warp White Side | Fill White Side |
|---|---|---|---|---|
| Bag 1 | 1.02 | 1.01 | 0.92 | 0.90 |
| Bag 4 | 1.05 | 1.10 | 0.89 | 0.68 |

The T-peel adhesion of the OPW air bags of the present invention was compared to a standard production, i.e., scoured fabric, air bag (units in N/mm):

|  | WMS Bg1 | WMS Bg4 | FMS Bg1 | FMS Bg4 | WWS Bg1 | WWS Bg4 | FWS Bg1 | FWS Bg4 |
|---|---|---|---|---|---|---|---|---|
| Scoured OPW AVG (89 lots) | 0.74 | 0.73 | 0.61 | 0.64 | 0.63 | 0.63 | 0.53 | 0.54 |
| Loom-state OPW lot #1 | 0.97 | 1.07 | 0.79 | 1.13 | 0.86 | 0.84 | 0.78 | 0.90 |
| Loom-state OPW lot #2 | 1.02 | 1.05 | 1.01 | 1.10 | 0.92 | 0.89 | 0.90 | 0.68 |

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations.

Having described the invention, the following is claimed:

1. A method for manufacturing a one-piece woven (OPW) air bag, comprising:
   providing yarns having a spin finish thereon;
   warping the yarns on at least one beam of an air jet or rapier loom;
   simultaneously weaving the yarns with the air jet or rapier loom into a fabric air bag structure having two layer portions defining an inflatable volume and single layer portions forming seams delimiting the inflatable volume;
   coating the air bag structure with a coating formulated to adhere to the spin finish of the woven yarns; and
   cutting the coated air bag structure to define the OPW air bag.

2. The method of claim 1, wherein the coating comprises silicone.

3. The method of claim 2, wherein the coating comprises a polyvinyl chloride (PVC) base coat that adheres to the spin finish.

4. The method of claim 2, wherein the silicone coating includes a phosphate-based flame retardant material.

5. The method of claim 2, wherein the silicone coating comprises an anti-blocking urethane.

6. The method of claim 2, further comprising an anti-blocking urethane applied on the silicone coating.

7. The method of claim 1, wherein the air bag structure is coated without scouring the yarns.

8. The method of claim 1, wherein the air bag structure is coated without washing the yarns.

9. The method of claim 1, wherein the air bag structure is coated without drying the yarns.

10. The method of claim 1, wherein the coating has a T-peel adhesion with the air bag structure of about 0.78 to about 1.13.

11. The method of claim 1, wherein the spin finish comprises about 1.0-3.0% by weight of the OPW air bag.

12. The method of claim 1, wherein the air bag structure forms a side curtain.

13. An OPW air bag manufactured according to claim 1.

14. The OPW air bag of claim 13, wherein the OPW air bag forms a side curtain.

15. The method of claim 1, wherein the step of coating the air bag structure comprises coating the airbag without scouring, washing, or drying the air bag structure.

16. The method recited in claim 1, wherein the fabric airbag structure is coated in loom-state, free from scouring, heating, washing, or drying prior to the step of coating the loom-state OPW fabric structure.

17. A method for manufacturing a one-piece woven (OPW) air bag, comprising:
    providing yarns having a spin finish thereon;
    weaving the yarns with an air jet or rapier loom to form a loom-state OPW fabric structure having two layer portions defining an inflatable volume and single layer portions forming seams delimiting the inflatable volume;
    coating the loom-state OPW fabric structure with a coating formulated to adhere to the spin finish of the woven yarns; and
    cutting the coated air bag structure to define the OPW air bag.

18. The method recited in claim 17, wherein the loom-state OPW fabric structure is free from scouring, heating, washing, or drying prior to the step of coating the loom-state OPW fabric structure.

* * * * *